US011794626B2

(12) United States Patent
Yabushita et al.

(10) Patent No.: US 11,794,626 B2
(45) Date of Patent: Oct. 24, 2023

(54) INTERIOR UNIT, VEHICLE AND CONTROL METHOD

(71) Applicant: Toyota Jidosha Kabushiki Kaisha, Toyota Aichi-ken (JP)

(72) Inventors: Hiroki Yabushita, Toyota (JP); Keiichi Kondo, Chiryu (JP); Kaori Takahashi, Nagoya (JP); Jin Xin, Nagoya (JP); Daisuke Mizushima, Toyota (JP); Satoru Ando, Nagoya (JP); Takeshi Murakami, Okazaki (JP); Yuchi Yamanouchi, Toyota (JP); Kenta Miyahara, Toyota (JP); So Sawahira, Toyota (JP); Rina Mukai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 483 days.

(21) Appl. No.: 17/091,589

(22) Filed: Nov. 6, 2020

(65) Prior Publication Data

US 2021/0138953 A1    May 13, 2021

(30) Foreign Application Priority Data

Nov. 7, 2019  (JP) .................................. 2019-202069

(51) Int. Cl.
*B60P 3/34* (2006.01)
*B60P 3/38* (2006.01)

(52) U.S. Cl.
CPC .. *B60P 3/34* (2013.01); *B60P 3/38* (2013.01)

(58) Field of Classification Search
None
See application file for complete search history.

(56) References Cited

U.S. PATENT DOCUMENTS

| | | | | |
|---|---|---|---|---|
| 5,676,341 | A * | 10/1997 | Tarusawa ............. | B60N 2/0705 296/65.13 |
| 6,406,083 | B2 * | 6/2002 | Bharj ..................... | B60R 5/044 296/37.16 |
| 8,398,140 | B2 * | 3/2013 | Dinger ................... | B60R 5/041 296/106 |
| 9,102,252 | B2 * | 8/2015 | Sugiyama ............ | B60N 2/5858 |
| 9,327,625 | B2 * | 5/2016 | Sakata ................. | B60N 2/0244 |
| 10,245,976 | B2 * | 4/2019 | Hotary ................. | B60N 2/0228 |
| 2008/0136237 | A1 * | 6/2008 | Kayumi ................ | B60N 2/914 297/284.9 |
| 2017/0335561 | A1 | 11/2017 | Wickramasekera | |

FOREIGN PATENT DOCUMENTS

JP     H08156841 A     6/1996
JP     2017-193188 A   10/2017

* cited by examiner

*Primary Examiner* — Joseph D. Pape
(74) *Attorney, Agent, or Firm* — Dinsmore & Shohl LLP (57) ABSTRACT

The present disclosure makes it possible to freely exchange interior of a vehicle. An interior unit according to the present disclosure is provided with: a frame portion attachable to and detachable from a vehicle; and interior parts installed on the frame portion. The frame portion is foldable, or extendable and contractible.

9 Claims, 14 Drawing Sheets

INTERIOR UNIT, VEHICLE AND CONTROL METHOD

CROSS REFERENCE TO THE RELATED APPLICATION

This application claims the benefit of Japanese Patent Application No. 2019-202069, filed on Nov. 7, 2019, which is hereby incorporated by reference herein in its entirety.

BACKGROUND

Technical Field

The present disclosure relates to an interior unit to be mounted on a vehicle.

Description of the Related Art

In Japanese Patent Laid-Open No. H8-156841, a floor of a camping car having a shape corresponding to a structure of the camping car is described. In Japanese Patent Laid-Open No. 2017-193188, a configuration in which an automotive instrument panel is attachable and detachable by a magnet is described.

SUMMARY

An object of the present disclosure is to provide a technique that makes it possible to freely exchange interior of a vehicle.

An interior unit according to one aspect of the present disclosure is provided with:
 a frame portion attachable to and detachable from a vehicle; and
 interior parts installed on the frame portion; and
 the frame portion is foldable, or extendable and contractible.

In a control method according to one aspect of the present disclosure,
 a processor executes:
 detecting whether an interior unit has been installed on a vehicle or not, the interior unit comprising a frame portion attachable to and detachable from the vehicle, and interior parts installed on the frame portion, and the frame portion being foldable, or extendable and contractible; and
 causing the interior parts to transform from a stored form to a used form by filling inner space portions of the interior parts with air when detecting that the interior unit has been installed on the vehicle.

According to the present disclosure, it is possible to provide a technique that makes it possible to freely exchange interior of a vehicle.

DESCRIPTION OF THE EMBODIMENT

In the present embodiment, an interior unit is attachable to and detachable from a vehicle, and it is possible to easily change an interior by exchanging the interior unit. The interior unit is provided with a frame portion attachable to and detachable from the vehicle and interior parts installed on the frame portion. Note that, in the present embodiment, such components that are provided in the vehicle are generically referred to as the interior, and, among components of the interior, components other than the frame portion are referred to as interior parts. As the interior parts, for example, seats, speakers, displays, air bags, lighting equipment, curtains, a kitchen table, ventilation fans, beds, water supply equipment, a restroom, shower equipment, interior panels, heat-insulating material, sound-insulating material, electric wires and the like are given.

Since the frame portion is attachable to and detachable from the vehicle, a user can remove the interior unit from the vehicle to exchange the interior unit with an interior unit provided with desired interior parts as necessary. In other words, the interior unit of the present embodiment makes it possible to change the interior without requiring special skills.

Figure 1:
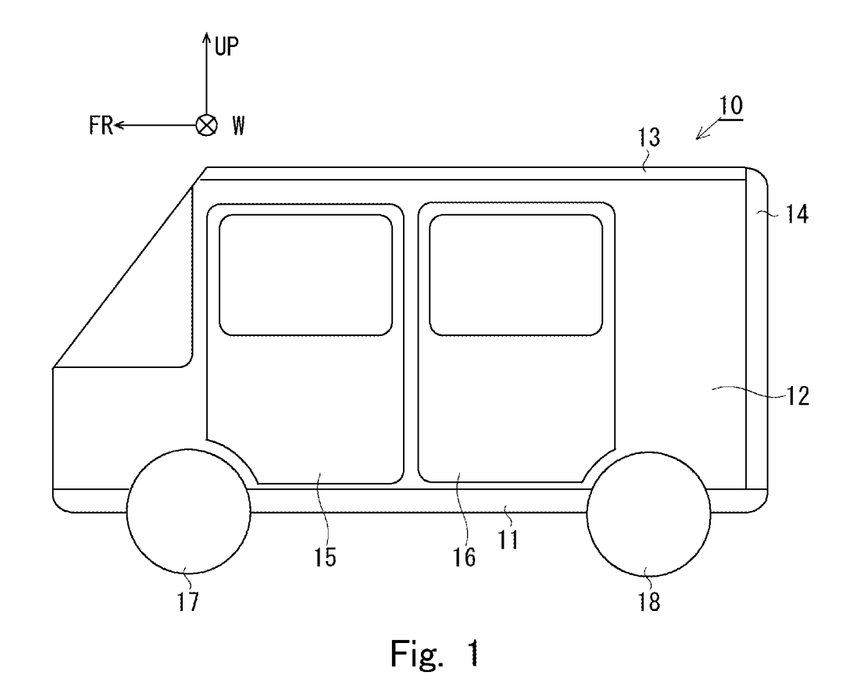
FIG. 1 is a side view of a vehicle.
Figure 2:
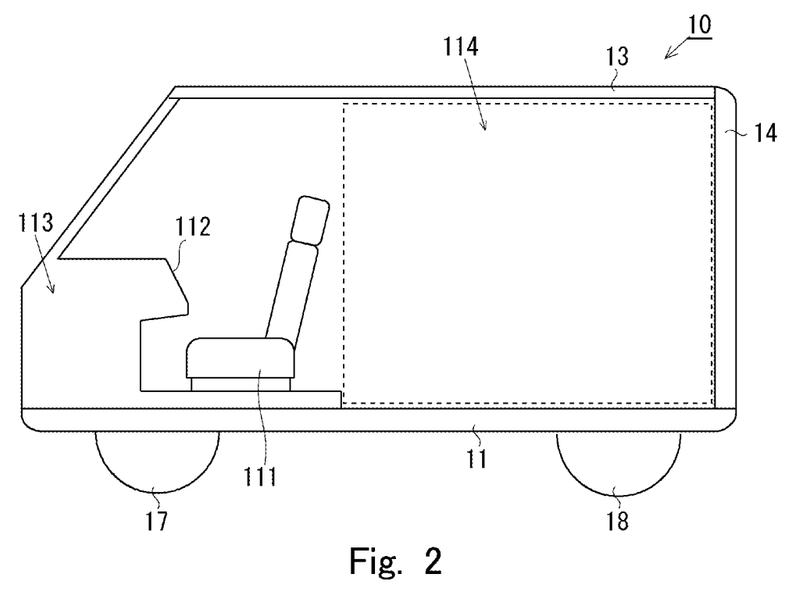
FIG. 2 is a longitudinal sectional view of a state in which an interior unit has been removed from the vehicle.
Figure 3:
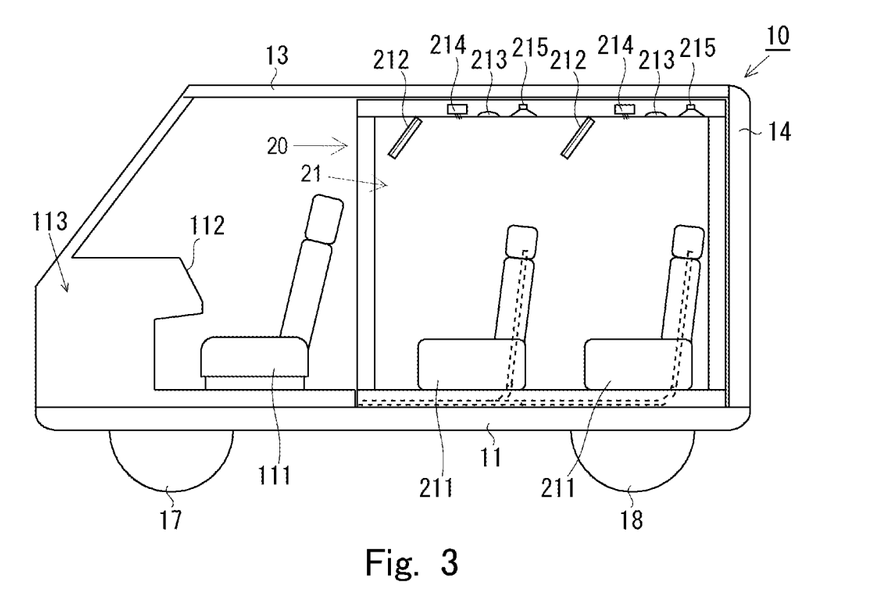
FIG. 3 is a longitudinal sectional view of a state in which the interior unit is attached to the vehicle.

FIG. 1 is a side view of a vehicle 10 according to the present embodiment; FIG. 2 is a longitudinal sectional view of a state in which an interior unit 20 has been removed from the vehicle 10; and FIG. 3 is a longitudinal sectional view of a state in which the interior unit 20 is attached to the vehicle 10. Note that an arrow FR, an arrow UP and an arrow W that are appropriately written in drawings indicate a forward direction in a vehicle longitudinal direction, an upward direction in a vehicle vertical direction and a vehicle width direction, respectively.

The vehicle 10 is provided with a floor 11 forming a bottom portion of the vehicle 10, side panels 12 forming side walls of the vehicle 10, and a roof panel 13 forming a ceiling portion of the vehicle 10. Doors 15 and 16 are openably and closably provided on a side panel 12; tires 17 and 18 are provided on a lower part of the vehicle 10; and a rear door 14 is provided on a rear part of the vehicle 10. In the present embodiment, the floor 11, the side panels 12 and the roof panel 13 constitute a vehicle body of the vehicle 10.

As illustrated in FIG. 2, a front seat 111 is provided on a front-side part in the vehicle 10. Note that, in the present embodiment, a right side and a left side of the front seat 111 are a driver's seat and a passenger seat, respectively. A dashboard 112 is provided in front of the front seat 111, and an engine, a battery, an air conditioner, a compressor and an ECU (Electronic Control Unit) and the like are provided in a front space 113 from the dashboard 112 to a front end of the vehicle 10.

A space 114 where the interior unit 20 is attached and detached is formed behind the front seat 111, and FIG. 2 illustrates a state in which the interior unit 20 has been removed. Therefore, equipment such as seats and lighting equipment is not provided in the space 114. The space 114 is separated from the outside by the floor 11, the left and right side panels 12, the roof panel 13 and the rear door 14.

As illustrated in FIG. 3, the interior unit 20 is put into the space 114 from the rear door 14 and attached. Thereby, equipment provided on the interior unit 20 can be used. For example, the interior unit 20 in FIG. 3 is provided with seats 211, displays 212, lighting equipment 213, air conditioner outlets 214 and speakers 215 as interior parts 21. In the present embodiment, when the interior unit 20 is put into the vehicle 10, a front end of the interior unit 20 is abutted against a rear surface of a front floor, and a rear end of the interior unit 20 is pressed and held by the rear door 14 and the like. Note that, without being limited thereto, the interior unit 20 may be provided with a detaching/attaching mechanism that is installed by being engaged with or fitted to the floor 11 on the vehicle 10 side or a mechanism on the side panels 12 side, and is detached by releasing the engagement or fitting.

Figure 4A:
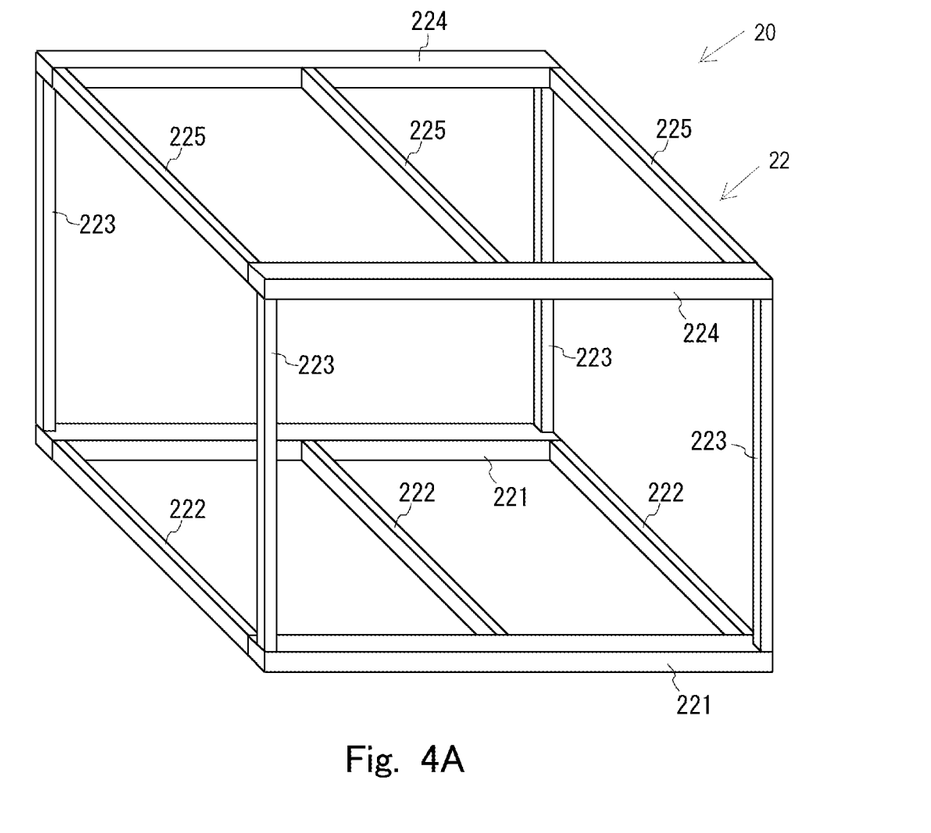
FIG. 4A is a perspective view of a frame portion.
Figure 4B:
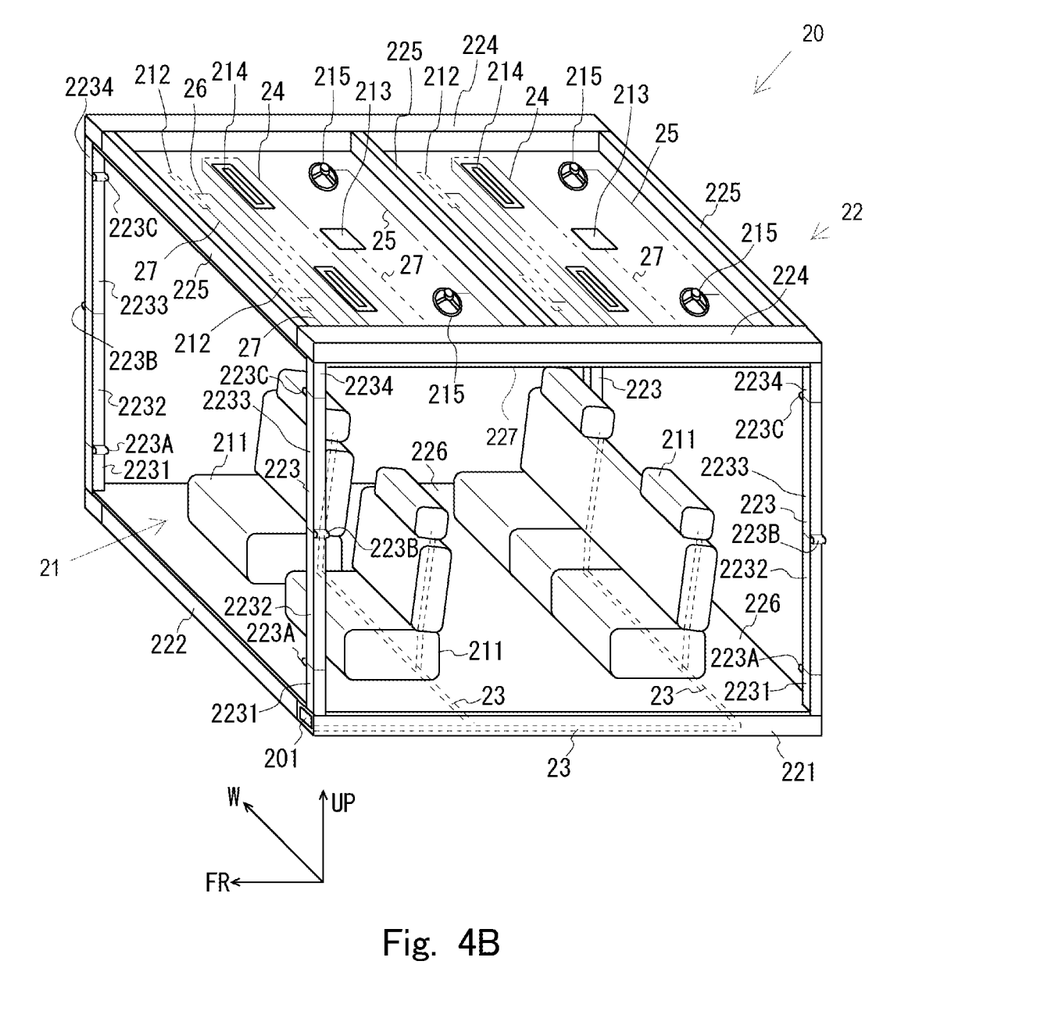
FIG. 4B is a perspective view of the interior unit.

FIGS. 4A and 4B are perspective views of the interior unit 20. A frame portion 22 of the interior unit 20 is provided with longitudinal first frame members 221 on left and right lower ends in the longitudinal direction as a foundation, and is provided with a plurality of second frame members 222 between the left and right first frame members 221. Further, the frame portion 22 is provided with third frame members 223 provided standing on an upper surface of the first frame members 221, fourth frame members 224 connecting upper ends of the third frame members 223 in the longitudinal direction, and fifth frame members 225 connecting the left and right fourth frame members 224 in a lateral direction.

A flooring 226 is laid on upper surfaces of the first frame members 221 and the second frame members 222, and a top board 227 is provided on lower surfaces of the fourth frame members 224 and the fifth frame members 225.

Piping 23 that causes compressed air to pass through is provided on a lower side of the flooring 226 and is connected to the seats 211. Each seat 211 has an inner space portion that can be filled with air, inside. The seat 211 is in a used form by the inner space portion being filled with air and is in a stored form by letting the air out of the inner space portion.

Figure 5:
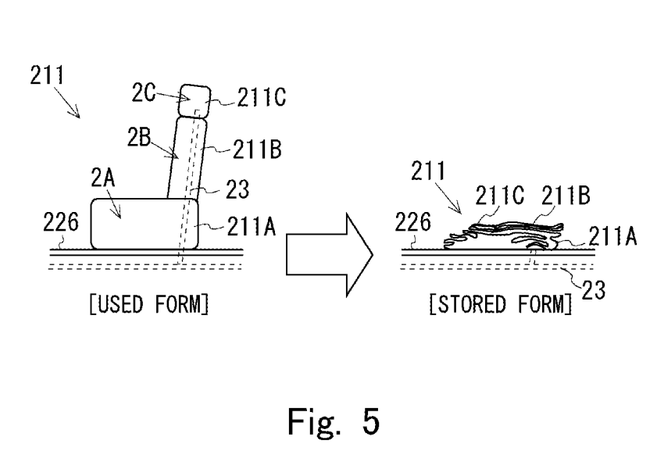
FIG. 5 is a diagram illustrating change from a used form to a stored form of a seat.

FIG. 5 is a diagram illustrating change from the used form to the stored form of each seat 211. The seat 211 is provided with portions such as a seating portion 211A, a seat back 211B and a headrest 211C, and each portion is formed in a bag shape with an airtight material. The portions of the seat 211 are connected to the compressed air piping 23. By inner space portions 2A to 2C of the portions being filled with air to swell, the shape of the seat 211 is formed as illustrated in FIG. 5. Note that each portion is provided with a compression sensor, a solenoid valve and an operating portion and may be configured so as to adjust a pressure to a specified pressure by the user operating the operating portion. Thereby, the user can adjust the seat 211 to a desired hardness. By discharging air in the inner space portions 2A to 2C via the piping 23, the seat 211 can be contracted to the stored form.

Figure 6:
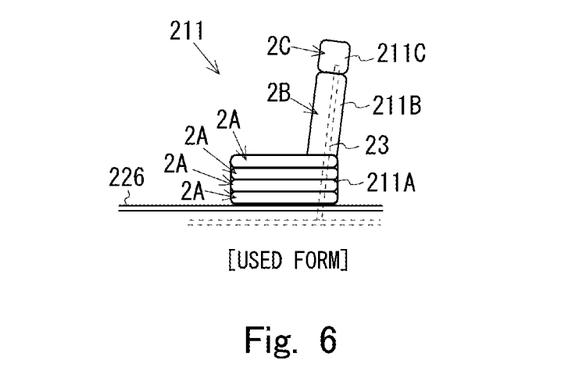
FIG. 6 is a diagram illustrating an example of the seat that is provided with a height adjustment mechanism.

Further, each seat 211 may be configured so that height adjustment is possible. FIG. 6 is a diagram illustrating an example of the seat 211 that is provided with a height adjustment mechanism. The seat 211 in FIG. 6 is provided with a plurality of inner space portions 2A in the seating portion 211A, and the inner space portions 2A are laminated in a height direction. For the seating portion 211A in FIG. 6, filling or discharge of air can be selected for each of the inner space portions 2A, and a height of a seating face of the seating portion 211A can be adjusted according to the number of inner space portions 2A to be filled. In other words, the seating face becomes higher when the number of inner space portions 2A filled with air is larger, and the seating face becomes lower when the number of inner space portions 2A filled with air is smaller.

Further, on the lower side of the top board 227, piping 24 that causes conditioned air to pass through, a signal line 25 and a power line 27 are provided. The piping 24 is connected to the air conditioner outlets 214 and causes air that is temperature-adjusted by the air-conditioner to blow out from the air conditioner outlets 214. The signal line 25 is connected to the speakers 215, and sends a sound signal outputted from audio equipment or the like to the speakers 215 to output sound. The power line 27 supplies power to electrical appliances such as the displays 212 and the lighting equipment 213. Note that the equipment to which the signal line 25 and the power line 27 are connected is not limited to the example of FIG. 3 but may be other electronic equipment such as a camera, a sensor and a communicator. Further, though the power line 27 supplies power, for example, of DC 12V, the power line 27 may supply power with other voltages such as DC 24V without being limited to DC 12V. Further, alternating-current power of AC 100V or the like may be supplied.

The interior unit 20 of FIG. 4B is in a configuration in which upper and lower surfaces of the frame portion 22 are closed by the top board 227 and the flooring 226, and sides are open. Note that, without being limited to thereto, a configuration in which the sides of the frame portion 22 are closed is also possible. In this case, an opening or a door may be provided on a part of a side facing the door 16 so that the user can get on and off through the opening or the door. Further, the sides of the frame portion 22 may be configured to openably and closably partition the interior unit 20 with curtains or roll-up blinds. Furthermore, though the door 16 is provided on a side panel 12 in the present embodiment, the interior unit 20 may be provided with a door to be separated from the outside, without providing the door 16 on the side panel 12.

Figure 7:
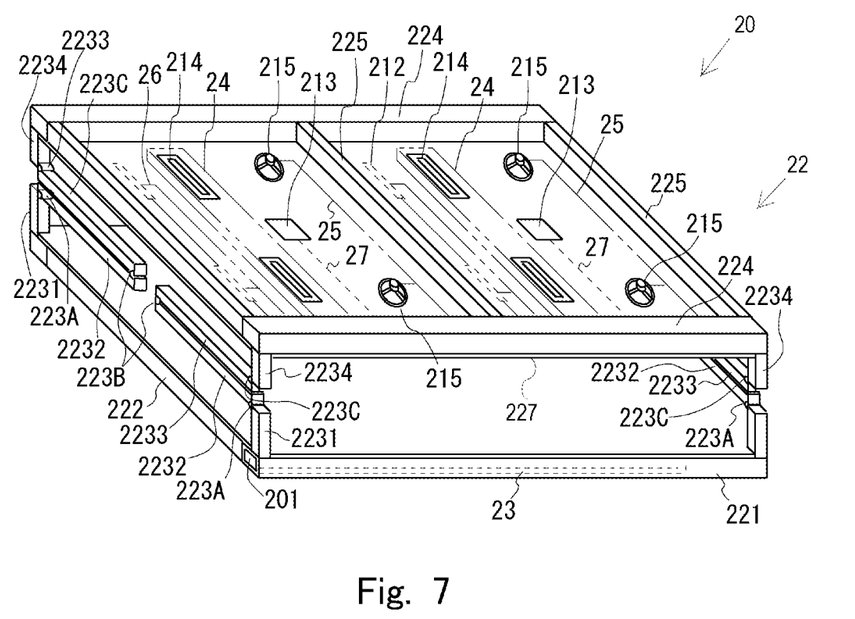
FIG. 7 is a diagram illustrating an example of the interior unit that is foldable.

At least a part of the frame portion 22 of the interior unit 20 is foldable, or extendable and contractible. For example, in FIGS. 4B and 7, each third frame member 223 of the interior unit 20 is in a configuration in which four links 2231 to 2234 are foldably connected by hinges 223A to 223C. In the interior unit 20, when the second links 2232 are laid down inside relative to the first links 2231, the third links 2233 are also laid down inside relative to the fourth links 2234 in conjunction. Then, the second links 2232 and the third links 2233 are folded inside as illustrated in FIG. 7, and a height of the interior unit 20 is contracted. Note that the seats 211 are caused to be in the stored form and, thereby, accommodated between the top board 227 and the flooring 226.

Figure 8:
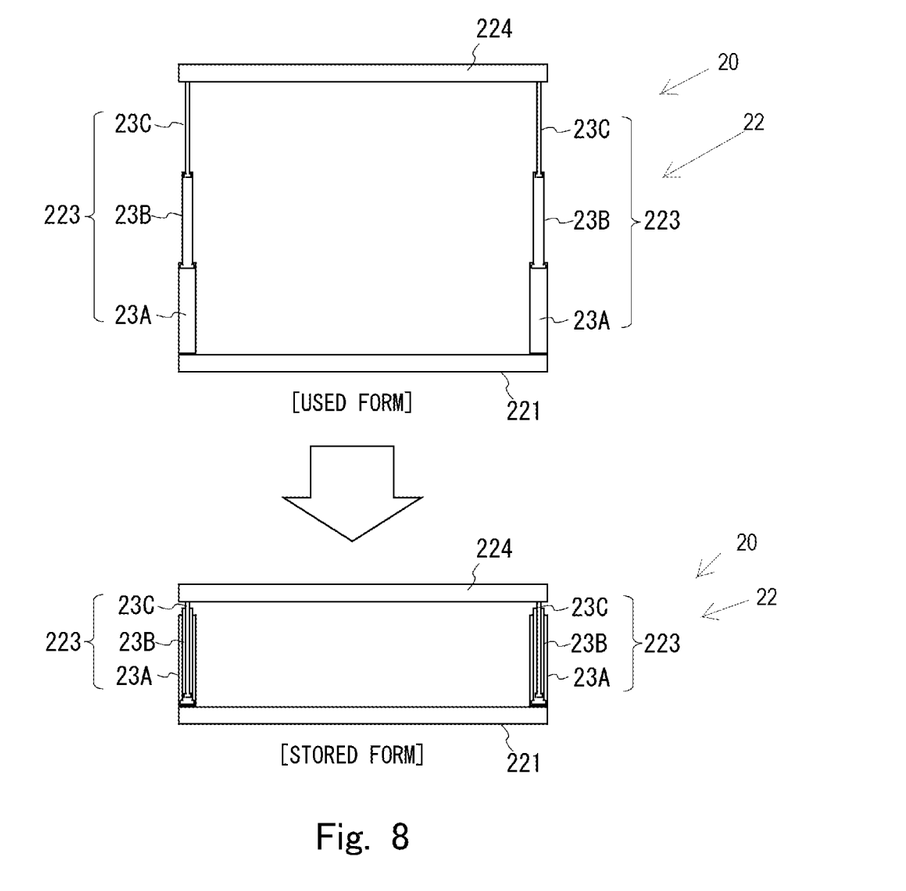
FIG. 8 is a diagram illustrating an example of the interior unit that is extensible and contractible.

FIG. 8 is a schematic view illustrating the frame portion 22 of the interior unit 20 that is extensible and contractible. In FIG. 8, each third frame member 223 is provided with a plurality of parts 23A to 23C obtained by being divided in the height direction. The parts 23A to 23C are in hollow circular tube shapes or prism shapes and are similar figures with different widths, and they are in a telescopic structure in which a part with a smaller width is included in a part with a larger width in order. Connection portions of the parts 23A to 23C are provided with stoppers. By the stoppers abutting the parts 23A to 23C in a state of the part 23B being pulled out from the part 23A and the part 23C being pulled out from the part 23B, the parts 23A to 23C are prevented from being coming out. Further, the connection portions of the parts 23A to 23C are provided with engaging portions, and the engaging portions engage with the parts 23A to 23C in a state of the parts 23A to 23C being pulled out, so that the pulled-out state is held. In other words, the third frame members 223 are in an extended state, and the interior unit 20 is in the used form.

On the other hand, by releasing engagement among the parts 23A to 23C and causing a smaller part to be accommodated into a larger part in a nested state, the third frame members 223 contract, and the interior unit 20 is in the stored form.

As described above, since the interior unit 20 of the present embodiment is foldable, or extensible and contractible, a storage space is reduced, and storability is improved.

Figure 9:
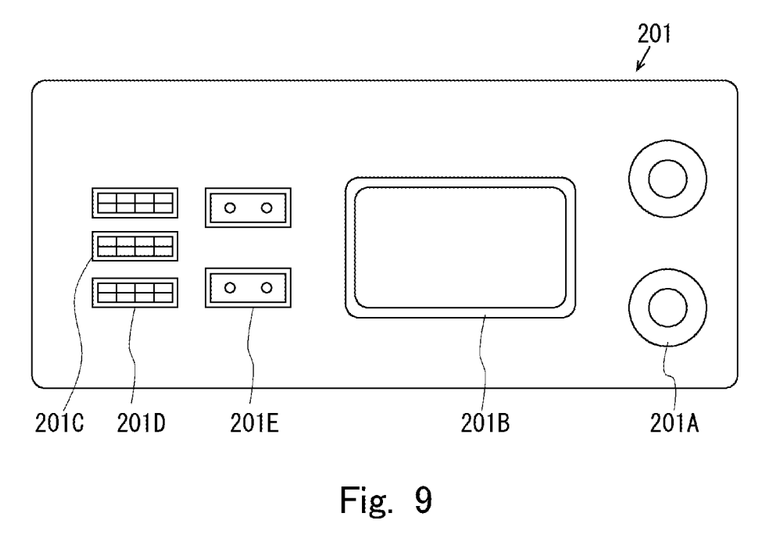
FIG. 9 is a diagram illustrating a connection port of the interior unit.
Figure 10:
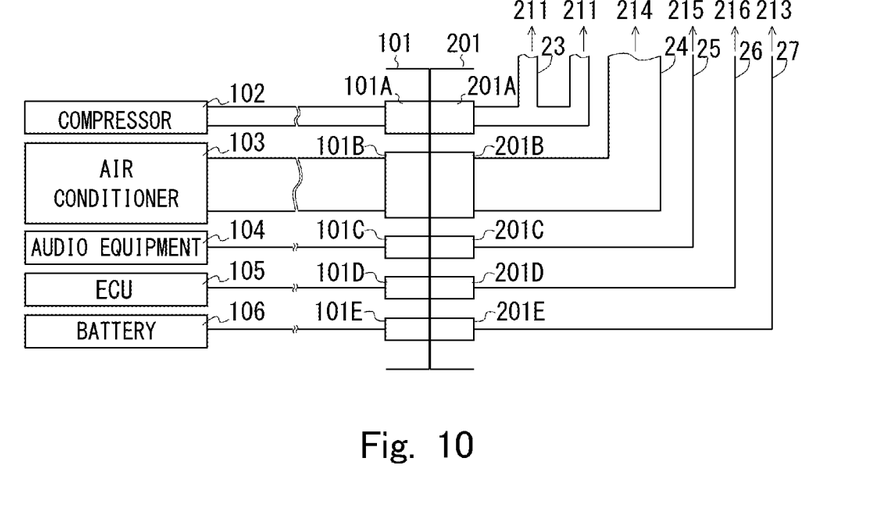
FIG. 10 is a diagram illustrating connection relationships between interior parts and vehicle-side apparatuses that are connected via the connection port.

FIG. 9 is a diagram illustrating a connection port 201 of the interior unit 20, and FIG. 10 is a diagram illustrating connection relationships between the interior parts 21 and vehicle-side apparatuses that are connected via the connection port 201.

As shown in FIG. 9, the connection port 201 is provided with a compressed air connector 201A, a conditioned air connector 201B, signal line connectors 201C and 201D, and a power line connector 201E.

Even in a different kind of interior unit 20 equipped with different interior parts, the connection port 201 is provided at the same position. Therefore, in any interior unit 20, a vehicle-side connection port 101 provided at a particular position in the vehicle 10 and the interior-unit-side connection port 201 are arranged to be connected when the interior unit 20 is installed on the vehicle 10. By the vehicle-side connection port 101 and the interior-unit-side connection port 201 are connected, connectors 101A to 101E of the connection port 101 are connected to the connectors 201A to 201E of the connection port 201, respectively.

By the connector 101A and connector 201A being connected, a compressor 102 provided on the vehicle side 10 and the piping 23 on the interior unit 20 side are connected, and compressed air sent out from the compressor 102 is supplied to the seats 211 via the piping 23. The compressor 102 may be an air pump having a function of not only sending out compressed air but also discharging air.

By the connector 101B and connector 201B being connected, an air conditioner 103 provided on the vehicle 10 side and the piping 24 on the interior unit 20 side are connected, and conditioned air that has been temperature-adjusted by the air conditioner 103 is blown out from the air conditioner outlets 214 via the piping 24.

By the connector 101C and connector 201C being connected, audio equipment 104 provided on the vehicle side 10 and the signal line (a speaker cable) 25 on the interior unit 20 side are connected, and a sound signal outputted from the audio equipment 104 is sent to the speakers 215 and outputted as sound.

By the connector 101D and connector 201D being connected, an ECU 105 provided on the vehicle side 10 is connected to a signal line 26 on the interior unit 20 side. Thereby, the ECU 105 is connected to a communication line, for example, CAN or the like and is communicably connected to a memory 216 on the interior unit 20 side and electronic equipment such as the compression sensor, the solenoid valve, an actuator, a camera and the displays.

By the connector 101E and connector 201E being connected, a battery 106 provided on the vehicle side 10 and the power line 27 on the interior unit 20 side are connected, and power from the battery 106 is supplied to electronic equipment such as the displays and the lighting equipment.

Figure 11:
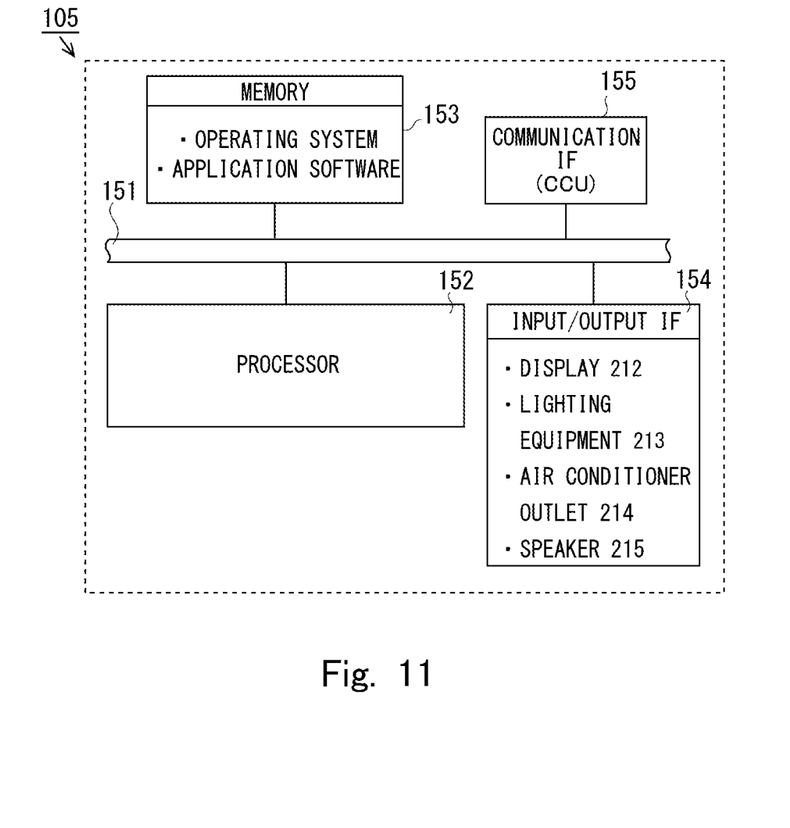
FIG. 11 is a hardware configuration diagram of an ECU.

FIG. 11 is a hardware configuration diagram of the ECU 105. The ECU 105 is, for example, a computer having a processor 152, a memory 153, an input/output IF (interface) 154 and a communication IF 155 that are mutually connected by a connection bus 151. The processor 152 performs control of the whole apparatus and the like by processing inputted information and outputting a processing result. The processor 152 is also called a CPU (Central Processing Unit) or an MPU (Micro-Processing Unit). The processor 152 is not limited to a single processor but may be in a multi-processor configuration. Further, a multi-core configuration is also possible in which a plurality of cores are provided in a single chip connected with a single socket.

The memory 153 includes a main memory and an auxiliary storage. The main memory is used as a work area of the processor 152, a storage area where information processed by the processor 152 is temporarily stored and a buffer area for communication data. The main memory is a storage medium for the processor 152 to cache a program or data, or expand the work area. The main memory includes, for example, a RAM (Random Access Memory), a ROM (Read Only Memory) and a flash memory. The auxiliary storage is a storage medium that stores a program to be executed by the processor 152, data used for information processing, setting information about operations and the like. The auxiliary storage is, for example, an HDD (Hard Disk Drive), an SSD (Solid State Drive), an EPROM (Erasable Programmable ROM), a flash memory, a USB memory, a memory card or the like.

The input/output IF 154 is an interface that performs input/output of data with equipment connected to the ECU 105. The input/output IF 154 performs input/output of data with equipment, for example, a sensor, other ECUs, the operating portion, a microphone, a tuner to receive radio and TV broadcast waves, and the like. Further, the input/output IF 154 performs input/output of data with equipment such as a disk drive that reads data from a storage media such as a CD and a DVD, a card reader/writer, an amplifier, the displays and the speakers. The operating portion is an inputting portion to which information to the ECU 105 is inputted by an operation of the user, such as input buttons, a dial or a touch panel.

The communication IF 155 is an interface (a communication module) that performs communication with other apparatuses via a communication line and is also referred to as a CCU (Communication Control Unit). The communication IF 155 performs communication, for example, with a wireless communication system such as WiMAX (Worldwide Interoperability for Microwave Access), LTE (Long Term Evolution), WiFi or Bluetooth®. Note that, for each of the components of the ECU 105 illustrated in FIG. 11, more than one may be provided, or a part of the components may not be provided.

When detecting installation of the interior unit 20, the ECU 105 performs control to switch the form of the interior parts 21 and the like from the stored form to the used form.

Figure 12:
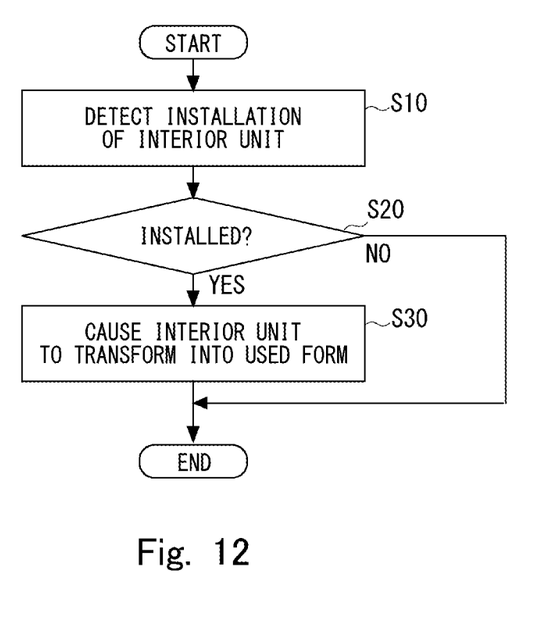
FIG. 12 is a diagram illustrating control of the ECU at the time of installing the interior unit.
Figure 13:
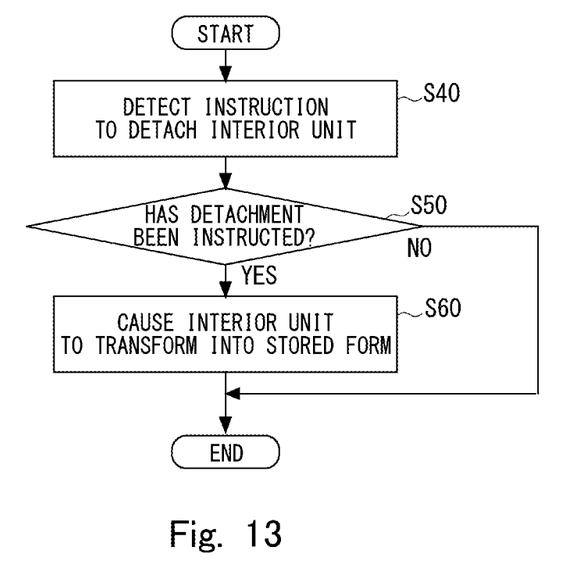
FIG. 13 is a diagram illustrating control of the ECU at the time of detaching the interior unit.

FIG. 12 is a diagram illustrating control of the ECU 105 at the time of installing the interior unit 20, and FIG. 13 is a diagram illustrating control of the ECU 105 at the time of detaching the interior unit 20. The ECU 105 executes a process of FIG. 12 in a predetermined cycle and, at step S10, detects information about the interior unit 20, for example, information showing whether the interior unit 20 has been connected or not. In the present embodiment, when the interior unit 20 is installed on the vehicle 10, the vehicle-side connection port 101 and the interior-unit-side connection port 201 are connected. Therefore, the ECU 105 is enabled to access a memory 216 provided in the interior unit 20 via the connectors 101D and 201D and acquires information about the interior unit 20 from the memory 216. Note that the information about the interior unit 20 is, for example, identification information about the interior unit 20, parameters such as the hardness and height of the seats 211 set by an operation of the user, and the like. The detection of the interior unit 20 is not limited to being performed by the connection port 101. Existence of the interior unit 20 may be detected by a contact sensor or the like. Further, a radio wave such as RFID may be outputted from the interior unit 20 so that, if the radio wave is received, the interior unit 20 may be detected as having been installed.

At step S20, the ECU 105 determines whether the interior unit 20 has been installed or not based on the detection result of step S10.

If a negative determination is made at step S20, the ECU 105 ends the process of FIG. 12 and, if a positive determination is made, proceeds to step S30.

At step S30, the ECU 105 causes the interior unit 20 to change from the stored form to the used form. For example, the ECU 105 drives the actuator to cause the folded third frame members 223 to be unfolded. Further, the ECU 105 controls the compressor 102 to supply compressed air to the interior parts 21 and causes the interior parts 21 to transform from the stored form to the used form. Note that the interior parts 21 that are transformed by compressed air are not limited to the seats 211 but may be tables and beds. Further, without being limited to transformation by compressed air, the ECU 105 may cause the interior parts 21 to transform from the stored form to the used form by an electric actuator. Further, information (setting information) when the user sets a direction of the displays 212, ON/OFF of the lighting equipment 213, the height of the seats 211, the hardness of the seats 211, an opened/closed state of the curtains and the like to desired states is stored in the memory 216 of the interior unit 20. The ECU 105 causes the frame portion 22 and the interior parts 21 to transform to the used form at step S30, reads out the setting information from the memory 216, and controls the compressor 102 or the actuator based on the information to adjust the interior parts 21 to be in the states set by the user.

After executing step S30, the ECU 105 ends the process of FIG. 12. Note that the ECU 105 of the present embodiment cyclically repeats the process of FIG. 12 to monitor installation of the interior unit 20. In this case, if the state in which it is determined that the interior unit 20 is not installed at step S20 last is switched to the state in which it is determined that the interior unit 20 has been installed, the ECU 105 makes a positive determination. Further, if the interior unit 20 is installed, and the interior unit 20 is not removed after execution of the process of step S30, then a negative determination is made at step S20 even if installation of the interior unit 20 is detected at step S10.

Further, the ECU 105 executes a process of FIG. 13 at a predetermined cycle, and detects information showing whether detachment of the interior unit 20 has been instructed from the user or not at step S40. For example, the user inputs the information instructing detachment to the ECU 105 using the operating portion connected to the input/output IF 154 of the ECU 105.

At step S50, the ECU 105 determines whether detachment of the interior unit 20 has been instructed or not based on the detection result of step S40.

If a negative determination is made at step S50, the ECU 105 ends the process of FIG. 13 and, if a positive determination is made, proceeds to step S60.

At step S60, the ECU 105 causes the interior unit 20 to change from the used form to the stored form. For example, the ECU 105 controls the compressor 102 to cause air in the interior parts 21 to be discharged and cause the interior parts 21 to transform from the used form to the stored form. Further, the ECU 105 drives the actuator to cause the third frame members 223 to be folded inside or contract and cause the frame portion 22 to change from the used form to the stored form.

As described above, in the present embodiment, since the interior unit 20 can be attached to and detached from the vehicle body (11, 12 and 13) of the vehicle 10, it is possible to freely change the interior without using special techniques and special tools.

Further, in the present embodiment, it is possible to, when the interior unit 20 is attached to the vehicle 10, cause the interior parts 21 and the frame portion 22 to automatically transform from the stored form to the used form. Therefore, at the time of loading or unloading the interior unit 20 on or from the vehicle 10, the user can easily load or unload the interior unit 20 without interfering with the rear door 14 and the like because the interior unit 20 is in the compact form. Furthermore, at the time of unfolding the interior unit 20 into the used form, the ECU 105 reads out the setting information from the memory 216 of the interior unit 20 and adjusts the states of the interior parts 21 based on the setting information. Thereby, it is possible to, at the time of unfolding the interior unit 20 into the used form, reproduce states set by the user last.

The processes described in the present disclosure can be freely combined and implemented unless technical contradiction occurs. For example, though, in the interior unit 20 described above, the frame portion 22 is formed in a cubic shape, the frame portion 22 may be planarly formed by the first frame members 221 and the second frame members 222, and the flooring 226 and the interior parts 21 may be provided thereon. A configuration is adopted in which the interior unit 20 is installed behind the driver's seat in the embodiment described above. However, without being limited thereto, a configuration is also possible in which the interior unit 20 is installed in a space including the driver's seat and the passenger seat. In other words, the driver's seat and the passenger seat may be exchangeable with the interior unit 20. Especially, in the case of an autonomous vehicle, since a driver's seat may be omitted, the interior unit 20 of the present embodiment may be applied to the autonomous vehicle, and the space of the driver's seat may be exchangeable with other equipment.

The present disclosure can be realized by supplying a computer program in which the functions described in the above embodiment are implemented, to a computer, and one or more processors that the computer has reading out and executing the program. Such a computer program may be provided to the computer by a non-transitory computer-readable storage medium connectable to a system bus of the computer or may be provided to the computer via a network. The non-transitory computer-readable storage medium is, for example, a disk of an arbitrary type such as a magnetic disk (a Floppy® disk, a hard disk drive (HDD) and the like)

and an optical disk (a CD-ROM, a DVD disk, a Blu-ray disk and the like). Further, as the non-transitory computer-readable storage medium, a read-only memory (ROM), a random access memory (RAM), an EPROM, an EEPROM, a magnetic card, a flash memory, an optical card, and a medium of an arbitrary type that is appropriate for storing electronic commands are included.

DESCRIPTION OF THE REFERENCE NUMERALS AND SYMBOLS

10: vehicle
11: floor
12: side panel
13: roof panel
14: rear door
15: door
16: door
17: tire
18: tire
20: interior unit
21: interior parts
22: frame portion

What is claimed is:

1. A vehicle comprising:
    an interior unit comprising:
        a frame portion attachable to and detachable from a vehicle, the frame portion is foldable, or extendable and contractible; and
        interior parts installed on the frame portion, the interior parts have inner space portions that can be filled with air, and the interior parts are in a used form by the inner space portions being filled with air and are in a stored form by letting the air out of the inner space portions;
    a compressor configured to supply air to the interior unit; and
    a processor configured to:
        when installation of the interior unit on the vehicle is detected, control the compressor to cause the interior parts to transform from the stored form to the used form; and
        when an instruction to detach the interior unit from the vehicle is detected, control the compressor to cause the interior parts to transform from the used form to the stored form.

2. The vehicle according to claim 1, wherein, when the interior unit is attached to the vehicle, the interior parts transform from the stored form to the used form by receiving supply of air into the inner space portions from a compressor mounted on the vehicle.

3. The vehicle according to claim 1, wherein the frame portion comprises a plurality of hinges, and at least a part of the frame portion is foldable by the hinges.

4. The vehicle according to claim 1, wherein at least a part of the frame portion extends and contracts by a telescopic structure.

5. The vehicle according to claim 1, wherein the interior parts are seats, speakers, displays, air bags, lighting equipment, curtains, a kitchen table, ventilation fans, beds, water supply equipment, a restroom, shower equipment, interior panels, heat-insulating material, sound-insulating material, power line or signal lines.

6. The vehicle according to claim 1, comprising a connector configured to receive supply of compressed air or conditioned air from the vehicle, the connector being provided at the same position on different kinds of interior units that are installable on the same vehicle.

7. A control method wherein a processor executes:
    detecting whether an interior unit has been installed on a vehicle or not, the interior unit comprising a frame portion attachable to and detachable from the vehicle, and interior parts installed on the frame portion, and the frame portion being foldable, or extendable and contractible; and
    causing the interior parts to transform from a stored form to a used form by filling inner space portions of the interior parts with air when detecting that the interior unit has been installed on the vehicle,
    wherein, when detecting an instruction to detach the interior unit from the vehicle, the processor controls a compressor to cause the interior parts to transform from the used form to the stored form.

8. The control method according to claim 7, wherein, when detecting that the interior unit has been installed on the vehicle, the processor causes the frame portion to transform form the stored form to the used form.

9. The control method according to claim 7, wherein
    a memory of the interior unit stores setting information showing states of the interior parts set by a user of the vehicle; and
    when detecting that the interior unit has been installed on the vehicle, the processor reads out the setting information about the interior parts from the memory of the interior unit, and adjusts the states of the interior parts based on the setting information.

* * * * *